Jan. 15, 1924.
O. DE GRENIER
LENS CUTTER
Filed Nov. 12, 1920
1,480,600
3 Sheets-Sheet 1
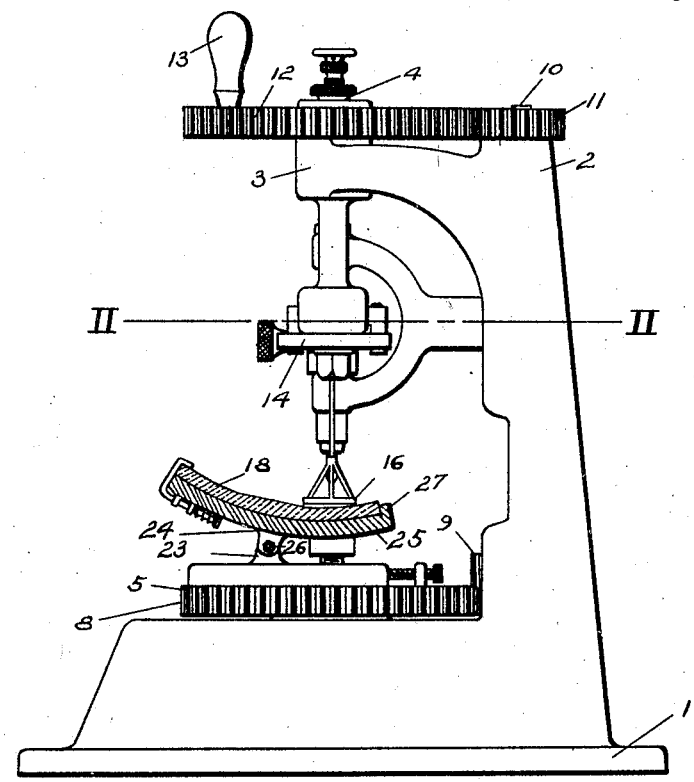
Fig. I
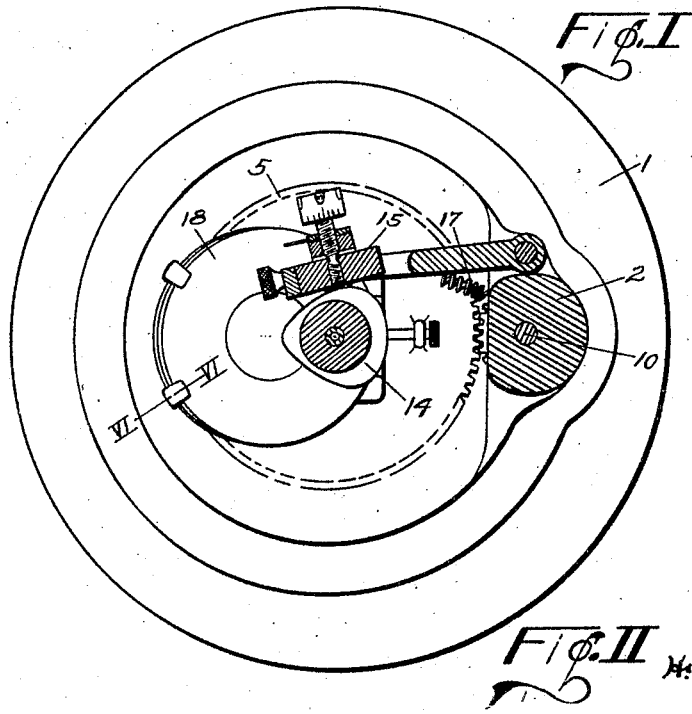
Fig. II
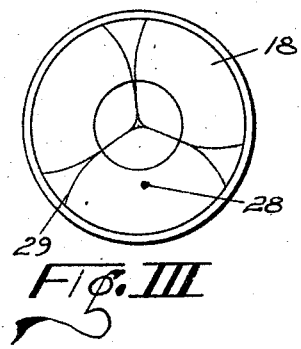
Fig. III
INVENTOR
OCTAVE DeGRENIER
BY
H. H. Styll, H. H. Parsons
ATTORNEYS Jan. 15, 1924.  
O. DE GRENIER  
LENS CUTTER  
Filed Nov. 12, 1920    3 Sheets-Sheet 2
1,480,600
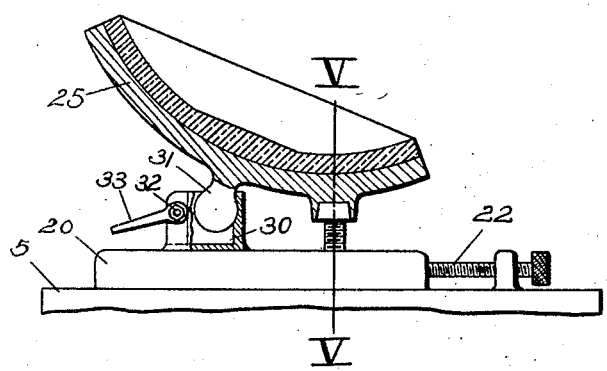
Fig. IV
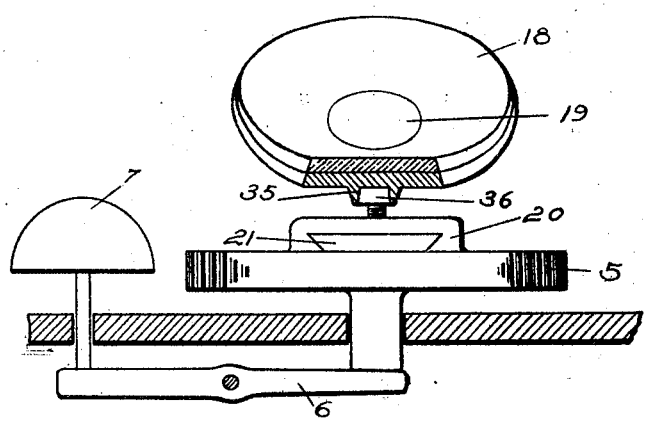
Fig. V
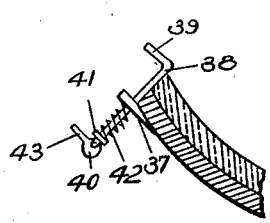
Fig. VI
INVENTOR  
OCTAVE DeGRENIER  
BY  
ATTORNEYS Jan. 15, 1924.
O. DE GRENIER
1,480,600
LENS CUTTER
Filed Nov. 12, 1920   3 Sheets-Sheet 3
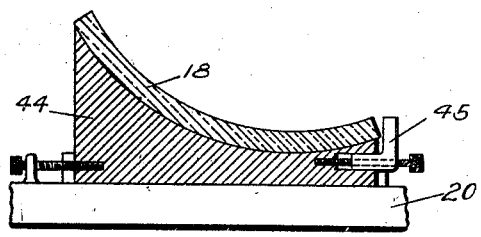
Fig. VII
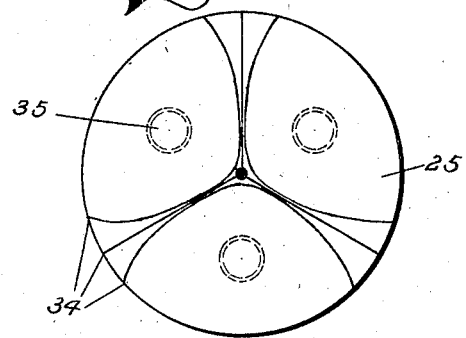
Fig. VIII
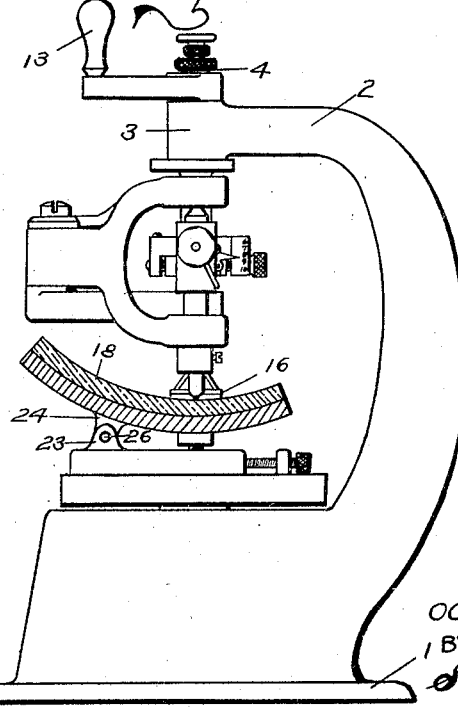
Fig. IX
INVENTOR
OCTAVE DeGRENIER
BY
Styll & Parsons
ATTORNEYS Patented Jan. 15, 1924.

1,480,600

UNITED STATES PATENT OFFICE.

OCTAVE DE GRENIER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS CUTTER.

Application filed November 12, 1920. Serial No. 423,667.

*To all whom it may concern:*

Be it known that I, OCTAVE DE GRENIER, a citizen of the United States, residing at Southbridge, in the county of Worcester and State of Massachusetts, have invented certain new and useful Improvements in Lens Cutters, of which the following is a specification.

This invention relates to improvements in machines designed for the cutting of ophthalmic lenses and has particular reference to a novel and improved machine particularly intended for use in the cutting of one-piece bifocal lens blanks.

The principal object of the present invention is the provision of a novel and improved construction of machine which can be satisfactorily employed to cut a plurality of individual lens blank portions out of an initial target type of blank as ground and which will operate on the bifocal face of the blank insuring this portion being correctly cut.

A further object of the present invention is the provision of a novel and improved construction of lens cutter which will serve to satisfactorily remove a portion of desired size and shape to one side of the center of the glass being operated on in place of removing the central portion as has been customary with types of cutters hitherto employed.

A further object of the invention is the provision of a device of this character in which the large blank may be satisfactorily positioned for the removal of a predetermined portion thereof, in which the same may be successively progressed to properly position different portions of the blank for removal of successive parts therefrom.

Another object of the present invention is the provision of a cutter of this type which shall have improved form of lens holding means which may be readily adjusted according to the size of the initial blank or disc to be cut and the size of the parts to be removed therefrom.

Other objects and advantages of my improved cutter should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation of a cutter constructed in accordance with and embodying the principles of my invention.

Figure II represents a horizontal sectional view taken as on the line II—II of Figure I.

Figure III represents a plan view of a bifocal disc after it has been operated on by my machine.

Figure IV represents a transverse sectional view of a portion of my mechanism.

Figure V represents a sectional view as on the line V—V of Figure IV.

Figure VI represents a fragmentary sectional view as on the line VI—VI of Figure II.

Figure VII represents a transverse sectional view of a modified form of holder.

Figure VIII represents a plan view illustrating the lay-out on the lens receiving face of my holder.

Figure IX represents a side elevation of a different type of machine embodying certain of my improved features of construction.

In the drawings, in which similar characters of reference are employed to denote corresponding parts throughout the several views, the numeral 1 designates the base of my improved type of cutter, having rising therefrom the standard 2 provided with the bracket 3 for the former spindle 4. Mounted upon the base 1 is the rotatable table 5 vertically shiftable as by the rock lever 6 and weighted handle 7, whose weight is sufficient to substantially counterbalance the weight of the table and associated parts so that a vertical adjustment will be quite sensitive and the lens may be easily shifted into and out of cutting position. This table has the toothed periphery as at 18 meshing with the enlongated pinion 9 on the shaft 10 which has a second pinion 11 meshing with the gear 12 on the upper end of the spindle 4. Rotation of the gear 12 as by the handle 13 serves to synchronously turn the spindle 4 and table 5. The spindle 4 is provided with a pattern 14 against which rests the cutter arm 15 bearing the cutter 16, this arm being pivoted to the standard 2 and resiliently held against the former 14 as by the spring 17.

My improved type of cutter is especially constructed for use in the separation of large bifocal target discs into a plurality of individual lens blanks. These discs are normally made of size to provide three or more lenses and the structure shown in the drawings is particularly adapted for use when it is desired to get blanks for three lenses from a single disc.

The discs 18 are ordinarily ground with the distance portion to a minus 6 diopter or stronger curve making the same of saucer like formation with a central reading portion as at 19 of a different and less concave curve so as to provide the necessary additional correction for reading in the finished lens.

Attempts have been made in the past to secure three lenses from a blank of this character by cutting the blank with lines radiating from center to edge, but difficulty has been here experienced due to the fact that these cuts when of unequal number tend to spread across into the opposed blank, splitting and rendering the latter useless. Similarly on account of limitations imposed by increase of prism as the diameter of the segment 19 is increased it is not practicable to make the disc 18 of size so that three blanks may be cut therefrom in the ordinary manner, as it is necessary that the cut extend very close to the center and that there be a minimum amount of waste material in the cutting operation. It is to get away from these and other difficulties of the prior art that I have provided my improved mechanism, which includes the slide 20 riding on the guide rib 21 of the table 5 and adjustable as by the screw 22 or other similar mechanism for shifting and locking the slide in desired transversely adjusted position upon the rotatable table. This slide is provided in the form shown in Figure I with an upstanding stud or support 23 to which is pivoted the shank 24 of the lens holder 25 a bolt or the like 26 serving to secure the lens holder in desired angularly adjusted relation. The holder is provided at its edges with suitable clips 27 serving to secure in position the disc or target 18 which is to be cut. It will be noted by reference to the several views of the drawings that when the disc to be cut is mounted upon the holder and the holder and its slide adjusted in correct transverse and angular positions, the point 28 denoting the center of the finished individual lens blank will lie at the axis of rotation of the table and former and will be so supported that the circle or outline to be traversed by the cutter 16 will lie substantially in a horizontal plane, the point 28 being the lowest point of the lens surface curve and the center of revolution of the portion of the lens to be operated on.

With the parts in this position it is then merely necessary to turn the gear 12 by the handle 13 when the former which is in the form of a heart shaped cam will be rotated with the lens giving the necessary in and out movement to the cutter 16 which will traverse a path on the lens as indicated by the line 29. This cut having been completed the lens is then suitably turned to present a second section thereof for cutting and then turned for a third cut, after which the lens is removed from the cutter and the blank separated along the line cut by the diamond.

In the form of holder illustrated in Figure I of the drawings it is necessary to shift the blank within the holder, but to get away from this necessity in the form of invention illustrated in Figures IV and V, for example, I have constructed the stud 30 corresponding to the stud 23 in the form of a hollow post or socket to receive the ball 31 on the back of the lens holder 25 and I provide on the post 30 the locking clamp 32 controlled by the handle 33 which may be given a quarter turn to release the bolt and permit of any desired angular adjustment of the holder, and also of rotatable adjustment of the holder, being then capable of being given a reverse quarter turn to lock the parts in adjusted position. In the use of this form of the invention the holder is preferably provided with the suitable lines or designations 34 on its upper face and the target disc is positioned on the holder with the parts if any to be eliminated in the cutting operation suitably disposed between the designations 34 which indicate the normal cut to be made by the cutter. The disc being in position it is then suitably secured to the holder and the holder rotated until one of its sockets 35 properly engages with the positioning abutment 36 carried by the slide 20. These abutments are disposed in the position indicated by the dotted line in Figure VIII of the drawings, there being a number of these corresponding to the positions to which the holder is to be adjusted before the entire target has been cut. It will thus be seen that it is merely necessary to position the target on the holder when the holder may be successively clamped in the several positions necessary to properly support the blank for the complete cutting operation, one cut being completed and the holder then turned to the new position, and the abutment and socket together absolutely correctly positioning and retaining the holder, even if there were no tightening of the locking member 32.

It is also to be noted that the member 36 is adjustable as to height according to the angle at which the holder is to be disposed so that the same mechanism may be satisfactorily employed for blanks having different curves.

Figure VI shows a detail view of one form of clamp which may be employed to advantage in connection with my improved holder, consisting of the supporting lug 37 through which slides the clamp rod 38 terminating in the clamp member 39 at one end and having secured to the opposite end the cam handle 40 adapted to bear against the washer 41 and compress the spring 42 which is mounted on the rod 38. In use the handle portion 43 of the cam is turned to rotate the rod 38 until the clamp 39 properly overlies the lens when the handle is then swung on its pivot, the cam bearing against the washer 41 and compressing the spring to resiliently securely clamp the lens in place.

While I have called particular attention to the angular adjustable type of lens holder shown in a number of the figures of the drawings, it will be understood that in the event that a large number of lenses of the same size and curve are to be operated upon in place of using the angularly adjustable or rotatable holder I may mount upon the slide 20 the solid or block holder 44 provided with the adjustable clamp 45 for variably engaging one edge of the lens, this holder being a solid member of substantially prismatic formation with curved upper face to hold the lens at the proper angle for the cutting action.

It is further to be understood that while I have particularly described my mechanism in connection with a rotatable lens table and former, my invention is capable of being carried out conversely with the stationary table and former using the same type of holder, and with the cutter 46 carried around over the lens and bearing against the former or guide pattern 14 to describe the proper figure on the lens, as is clearly illustrated in connection with Figure IX of the drawings.

From the foregoing description taken in connection with the accompanying drawings, the construction of my improved cutter should be readily apparent, and it will be seen that I have provided a novel and improved mechanism in which the lens is held tilted so that the cutter will be acting substantially normal to the portion to be operated upon, in which the cutter may be satisfactorily caused to travel over the surface and separate a selected part therefrom, and in which preferably the position of the supporting table may be so shifted as to successively present the several sections of the lens to be operated upon to the cutter, the holder being automatically positioned for the several cutting operations.

I claim:

1. A bifocal lens cutter including a table, a holder pivotally supported by the table, means for securing the holder in angularly adjusted position to one side of the center of the table, a cutter disposed over the table toward the center line thereof, and means for causing relative rotary movement between the cutter and holder to effect the cutting action, substantially as described.

2. A device for the purpose described including a table, a cutter disposed thereabove, means for relatively shifting said parts to cut a lens and a tilted support on the table laterally offset with respect to the cutter and having a portion at one side extending beneath the cutter, substantially as and for the purpose described.

3. A lens cutting machine, including a base, a bracket on the base, a sector-shaped guide member carried by the bracket, and a lens support on the base below the guide and offset with respect thereto, said support having a lateral portion thereof projecting beneath the guide.

4. A lens cutter guide of substantially heart shaped formation having a rounded end terminating in convergent lightly curved sides meeting in a rounded point, substantially as illustrated.

5. In a lens cutter, the combination with a base, of a lens holder carried thereby, and a cutter guide supported by the base above the holder in eccentric relation to the holder, said cutter guide having a pointed end projecting in the direction of the center of the lens holder.

6. A lens cutter including a base, a table carried by the base, an angularly adjustable work support mounted on the table, an abutment for cooperation with the support disposed for engagement with one side thereof, and a cutter guide member axially disposed as respects the abutment but eccentrically disposed as respects the work holder.

7. A lens cutter including a base, a cutter table rotatably mounted on the base, a lens support eccentrically disposed on the holder and having a portion extending in the direction of the axis of rotation thereof to support a lens with a lateral portion at the axis of rotation of the table, a bracket on the base, a cutter guide supported by the bracket in axial alinement with the center of rotation of the table, means for synchronously rotating the table and the guide, and a cutter having a cutting point for engagement with a lens on the holder and having a contact for engagement with the guide, the cutter being supported by the bracket with its contact in yielding engagement with the guide.

8. In a device of the character described, the combination with a base, of a rotatable table, of a work holder mounted on the table supported thereby and angularly disposed with respect thereto, said work holder having a central projection pivoted to the table, eccentric to the axis of rotation of the table and the table having a central support eccentrically engaging the holder.

9. In a device of the character described, the combination with a rotatable work table, of a work holder angularly and rotatably adjustable on the table about a point at one side of the center of rotation of the table.

10. In a device of the character described, the combination with a rotatable work table, of a work holder angularly and rotatably adjustable on the table about a point at one side of the axis of rotation of the table, and a central support on the table for adjustably engaging the work holder.

11. In a device of the character described, the combination with a work table, of a work holder angularly and rotatably adjustable on the table, and a support on the table for adjustably engaging the work holder, the work holder having a plurality of portions for selective interlocking engagement with the support to insure correct successive positions of the work holder.

12. A lens cutter including a base, a table rotatably mounted upon the base, a cutter guide mounted axially as respects the center of rotation of the table, means for synchronously rotating the table and cutter guide, and an angularly adjustable work holder carried by the table and eccentrically disposed as respects the axis of rotation thereof, substantially as and for the purpose described.

13. A lens cutter including a base, a table rotatably mounted upon the base, a cutter guide mounted axially as respects the center of rotation of the table, means for synchronously rotating the table and cutter guide, and an angularly adjustable work holder carried by the table and eccentrically disposed as respects the axis of rotation thereof, said cutter guide having a pointed end projecting laterally in the direction of eccentricity of the work holder.

In testimony whereof I have affixed my signature, in presence of two witnesses.

OCTAVE DE GRENIER.

Witnesses:
ESTHER M. LAFLER,
ALICE G. HASKELL.